United States Patent [19]

Yen et al.

[11] 4,285,819

[45] Aug. 25, 1981

[54] FUNCTIONAL MAGNETIC MICROSPHERES

[75] Inventors: Shiao-Ping S. Yen; Alan Rembaum; Robert F. Landel, all of Altadena, Calif.

[73] Assignee: California Institute of Technology, Pasadena, Calif.

[21] Appl. No.: 116,093

[22] Filed: Jan. 28, 1980

[51] Int. Cl.$^3$ ............................................ B01D 53/16
[52] U.S. Cl. .................................. 210/679; 210/683; 210/688; 210/695; 252/426
[58] Field of Search ...................... 210/36, 37 R, 37 B, 210/38 B, 425, 502, 506, 52, 683, 688, 695; 252/62.51, 62.52, 62.53, 62.54, 426

[56] References Cited

U.S. PATENT DOCUMENTS

| | | | |
|---|---|---|---|
| 3,533,940 | 10/1970 | Penniston et al. | 210/52 |
| 3,890,224 | 6/1975 | Weiss et al. | 210/223 |
| 4,018,678 | 4/1977 | Peniston | 210/36 |
| 4,089,779 | 5/1978 | Neal | 210/425 |
| 4,108,767 | 8/1978 | Cooper | 210/425 |
| 4,110,208 | 8/1978 | Neal | 210/425 |
| 4,169,804 | 10/1979 | Yapel, Jr. | 252/62.53 |
| 4,187,170 | 2/1980 | Westcott | 210/222 |

*Primary Examiner*—Theodore A. Granger
*Attorney, Agent, or Firm*—Poms, Smith, Lande & Rose

[57] ABSTRACT

Functional magnetic particles are formed by dissolving a mucopolysaccharide such as chitosan in acidified aqueous solution containing a mixture of ferrous chloride and ferric chloride. As the pH of the solution is raised magnetite is formed in situ in the solution by raising the pH. The dissolved chitosan is a polyelectrolyte and forms micelles surrounding the granules at pH of 8–9. The chitosan precipitates on the granules to form microspheres containing the magnetic granules.

On addition of the microspheres to waste aqueous streams containing dissolved ions, the hydroxyl and amine functionality of the chitosan forms chelates binding heavy metal cations such as lead, copper, and mercury and the chelates in turn bind anions such as nitrate, fluoride, phosphate and borate.

15 Claims, No Drawings

FUNCTIONAL MAGNETIC MICROSPHERES

ORIGIN OF THE INVENTION

The invention described herein was made in the performance of work under a NASA contract and is subject to the provisions of Section 305 of the National Aeronautics and Space Act of 1958, Public Law 83-568 (72 Stat. 435; 42 USC 2457).

TECHNICAL FIELD

The present invention relates to functional magnetic microspheres useful in the removal of soluble toxic materials such as lead, copper, mercury cations and nitrate, flouride, phosphate and borate anions from water. More particularly, the present invention relates to easily recoverable, functional magnetic microspheres comprising magnetic particles which are coated with a glucosamine polysaccharide such as chitosan, and to a method for forming the microspheres.

BACKGROUND ART

Considerable interest exists in commercial and governmental facilities to develop a low cost, fully effective, recyclable means for total removal of toxic materials from effluent waste water streams of all types, including agricultural run-off and geothermal brines.

Various ion exchange resins are known to provide a degree of removal of a single group of salt impurities; however, effective total removal of heavy metal ions such as mercury, lead and copper, and of certain anions such as nitrate, has been difficult with ion exchange resins. Additionally, many ion exchange resins, although recyclable, are expensive to produce.

Many effluent waste water streams contain a high degree of particulate matter. When the exchange resin or other removal agent is added to the effluent stream, it becomes comingled with the particulate waste matter. This condition presents problems in reclaiming the removal agent from the effluent stream without also removing large amounts of unwanted particulate matter.

One solution to this problem involves removal of the particulate matter from the waste stream prior to the addition of the toxic substance removal agent. This may be accomplished in small pilot plant operations; however, filtration is not practical for large scale industrial or agricultural operations where significant amounts of particulate matter are present in the effluent streams. Therefore, the exchange resin or removal agent must have properties which render it easily separable from an effluent stream containing silt, clay and other particulate matter.

STATEMENT OF THE INVENTION

A very effective low cost ion removal agent is provided in accordance with this invention. The agent contains functional groups capable of chelating heavy metal cations and binding or toxic anions. The agent has high capacity and operates at a fast rate. The agent is in particulate form and contains a dispersion of magnetic particles readily and efficiently separable from the stream and from other particulate matter by application of a magnetic field to the holding tank or conduit containing the contaminated body or stream of water. The agent can be manufactured from a low cost waste by-product of the shell fish industry and; therefore, a source of supply of raw material for manufacture is independent of the supply shortages and cost spiral of materials derived from petroleum. Furthermore, since the particles can be separated by magnetic means, they can be extremely small of the order of 100 angstroms to 1000 microns and, therefore, have an extremely large surface area available for gettering ions from aqueous solution.

The functional magnetic ion-removal agents in accordance with this invention are in the form of small magnetic particles dispersed in a mucopolysaccharide such as a glucosamine polysaccharide. The hydroxyl and amine functionality of the encapsulating polyelectrolyte forms chelate complexes with many heavy metal ions and these complexes in turn bind the anions removing both from solution in the aqueous stream. The particles can be regenerated by acid or base treatment. The particles operate effectively in the presence of bacteria and can be added to any stage of municipal waste. The functional magnetic mucopolysaccharide particles of the invention provide a low cost, fully effective, recyclable means for removal of toxic materials from waste streams of all types including municipal wastes, industrial wastes, agricultural run-off water and geothermal brines.

The functional magnetic agents are manufactured by in-situ formation of small magnetic particles within the microspheres. The mucopolysacharride dissolves in acid media (pH of 1 to 3) formed by adding it to a solution of a mixture of $FeCl_2$ and $FeCl_3$. The mucopolysaccharide is a polyelectrolyte surfactant. When a base is added to the solution and the pH raised to about 7, the iron chlorides hydrolyze to form the corresponding ferrous and ferric hydroxides and dehydrate and condense or polymerize to the most stable form, magnetite, $Fe_3O_4$. The polyelectrolyte surfactant surrounds these neutral $Fe_3O_4$ particles forming micelles and as the pH is raised to a pH of 8–9, the mucopolysaccharide becomes insoluble and the micelles precipitate to form the functional magnetic microspheres containing a dispersion of small, black, magnetite granules.

The size of the particles depends on the concentration of mucopolysaccharide in solution. At concentrations above 10% by weight, large particles over 1000 microns can be formed. At concentrations from 0.1 to 10% by weight particles having diameters from 100 angstroms to 1000 microns are formed. The magnetite particles are believed to be 50 angstroms in diameter or less.

The metal content of the microspheres can be varied over wide limits. If a very strong magnetic field is provided by a superconducting magnetic or a high-gradient field source, the microspheres can contain as little as 0.1% by weight of iron. The magnetic particles need only contain a monomolecular layer of the mucopolysaccharide to be effective and, therefore, the microspheres can contain 90% by weight or more of iron. Magnetite particles coated with a very thin layer of mucopolysaccharide are readily dispersible in aqueous solution whereas magnetite is very difficult to disperse in water. The magnetite particles can be readily coated or encapsulated by dispersing in aqueous polymerizable systems.

These and many other features and attendant advantages of the invention will become readily apparent as the invention becomes better understood by reference to the following detailed description.

DETAILED DESCRIPTION

A preferred source of mucopolysaccharide is a material such as chitosan. Chitosan is derived from a hydrolysis product of chitin which is the horny substance and a principal constituent of the shells of crabs, lobsters and beatles. Currently, chitosan is available as an ecological waste material at low cost. Chitosan is essentially insoluble in water at neutral or higher pH, but, can be dissolved at very low pH in the process of the invention.

Chitosan is a glucosamine polysaccharide having a degree of polymerization (DP) of about 500 to about 1500 of a repeating unit of the formula:

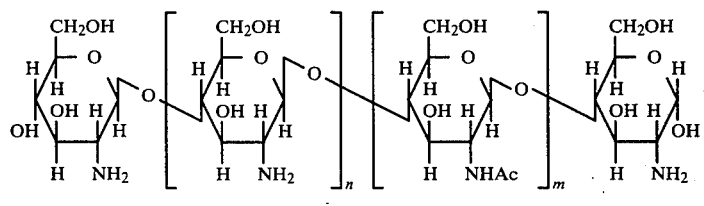

where $n+m=DP$, $m=O$ to $DP/2$ and $n=DP$ to $DP/2$.

Chitosan is a low cost biochemical product which is a superior material for encapsulating magnetic particles. Chitosan is a chelating agent which forms chelates with a large number of anions and cations and has been found to be fully effective in removing toxic ions from water solutions. By encapsulating a magnetic material with chitosan, recovery of the chitosan encapsulated magnetic particles from effluent streams can be easily accomplished by the application of a magnetic field. The chitosan is also readily regenerated.

Examples of practice follow: About 0.1 mole of ferrous chloride ($FeCl_2$) and 0.1 moles of ferric chloride ($FeCl_3$) is dissolved in an aqueous solution (430 ml.) of chitosan (1 wt. %) acidified with hydrochloric acid to a pH of 2. To this solution is added 40 ml. of aqueous sodium hydroxide (0.5 mole NaOH) while stirring and passing in argon gas through a bubbler. The pH changes from 2 to about 7. The mixture is then boiled for two hours in the presence of argon. The black solid chitosan encapsulated magnetic material is filtered off, washed with distilled water, and dried.

This provides a simple and economical method of producing the large quantities of chitosan encapsulated magnetite (magnetite-chitosan powder) which would be required in large industrial, governmental or agricultural operations.

Tests were performed to demonstrate the efficiency of the chitosan in removing heavy metal ions and nitrate ions from aqueous solutions. Five aqueous solutions containing various amounts of mercury nitrate, lead nitrate, cobalt nitrate, nickel nitrate and cadmium nitrate were stirred separately with magnetite-chitosan powder for one hour. The concentration of metallic elements before and after treatment was measured by atomic absorption spectroscopy and found to be as shown in Table I. An aqueous solution containing a mixture of the heavy metal nitrates was also treated with the magnetite-chitosan powder for one hour with the results also being shown in Table I.

TABLE I

Removal of metal nitrates by means of magnetite encapsulated in chitosan
(2g/10 ml, 80% $Fe_3O_4$, 20% chitosan)

| 1. One Salt in Solution | | | | |
|---|---|---|---|---|
| Co* ppm | Ni* ppm | Cd* ppm | Pb** ppm | Hg** ppm |
| Before treatment 5930 | 5850 | 1160 | 1800 | 1560 |
| After treatment 2330 | 1830 | 340 | 500 | 40 |
| Mixture of Salts | | | | |
| Before treatment 1100 | 1160 | 2240 | 4300 | 3200 |
| After treatment 580 | 210 | 360 | 400 | 60 |

*Accuracy of determination by atomic absorption + 2%

**Accuracy of determination by atomic absorption + 10%

The same salt solutions were analyzed by means of infra red spectroscopy and the concentrations of nitrate ions were determined before and after treatment by monitoring the 1380 $cm^{-1}$ peak. The results are shown in Table II.

TABLE II

Concentration of nitrate ion before and after treatment with magnetite-chitosan.

| 1. One Salt in Solution | | | | |
|---|---|---|---|---|
| Co ppm | Ni ppm | Cd ppm | Pb ppm | Hg ppm |
| Before treatment 12000 | 12000 | 12000 | 1200 | 4000 |
| After treatment 5400 | 4200 | 3900 | 600 | 1200 |
| 2. Mixture of Salts | | | | |
| | ppm | | | |
| Before treatment | 10000 | | | |
| After treatment | 3000 | | | |

As indicated by the above experiments, chitosan is capable of forming chelates with a large number of metallic elements. It has a high capacity and fast rate of binding to metallic ions. Additionally, chitosan has been found to remove fluorides and borates, both of which are present in geothermal brine and require removal.

Chitosan is also a superior material for encapsulating iron oxide particles formed directly from iron salts due to its polyelectrolytic character.

The chitosan functional magnetic microspheres were found to be very effective in the purification of contaminated water, because the amino and hydroxyl functional groups of chitosan form chelates with a large number of anions and cations. The recovery of the chitosan particles complexed with the salts is achieved simply by the application of a magnetic field to the contaminated water. This method can also be used to concentrate or remove heavy metal ions as well as nitrate ions.

Although only one preferred embodiment of the present invention has been disclosed, it is to be realized by those skilled in the art that various modifications can be made to the disclosed magnetic particles without departing from the scope of the invention. For example, chitosan is capable of encapsulating resin materials having magnetic material dispersed therein or may be used to encapsulate other magnetic materials. These examples are exemplary only and are not intended to limit the present invention which is defined by the following claims.

We claim:

1. A composition comprising functional magnetic microsphere particles having a diameter from 100 angstroms to 1000 microns consisting essentially of:

magnetic granules having a diameter less than 50 angstroms containing a coating of a water insoluble chitosan, said particles containing at least 0.1% by weight of metal.

2. A composition according to claim 1 in which the chitosan has a degree of polymerization for 500 to 1500.

3. A composition according to claim 2 in which the granules comprise magnetite.

4. A composition according to claim 1 in which the particles are in the form of chitosan microspheres containing a dispersion of magnetite granules.

5. A composition according to claim 1 in which the microspheres contain from 1 to 25% metal and have a diameter from 500 angstroms to 1 micron.

6. A method of removing ions from aqueous solution comprising the steps of:

adding functional magnetic particles to the solution; said particles comprising a dispersion of at least 0.1% by weight magnetic granules in a chitosan microsphere having a diameter from 100 angstroms to 1000 angstroms;

binding heavy metal ions to the particles to form chelates; and magnetically separating the particles from the solution.

7. A method according to claim 6 in which the ions are heavy metal ions that form chelate complexes with the coating on the particles.

8. A method according to claim 6 further including the step of binding anions from the solution to the chelate complexes.

9. A method of forming functional magnetic particles comprising the steps of:

dissolving a mixture of ferrous chloride and ferric chloride in water;
adjusting the pH of the solution to a pH of 1 to 3;
dissolving a mucopolysaccharide in the solution;
raising the pH to above 7 to form micelles of the mucopolysaccharide containing granules of magnetite; and
precipitating the mucopolysaccharide on the magnetite granules.

10. A method according to claim 9 in which the mucopolysaccharide is a glucosamine polysaccharide.

11. A method according to claim 10 in which the polysaccharide is chitosan.

12. A method according to claim 10 in which the particles are in the form of microspheres containing from 0.1 to 90% iron and have a diameter from 100 angstroms to 1000 microns.

13. A method according to claim 12 in which the microspheres contain from 1 to 25% metal and have a diameter from 500 angstroms to 1 micron.

14. A method according to claim 13 in which the magnetite granules have a diameter below 50 angstroms.

15. A method according to claim 14 in which the chitosan has a degree of polymerization from 500 to 1500.

* * * * *